(No Model.)
H. J. LEIGHTON & J. COFFIN.
GRADUATED SCALE.
No. 325,096. Patented Aug. 25, 1885.
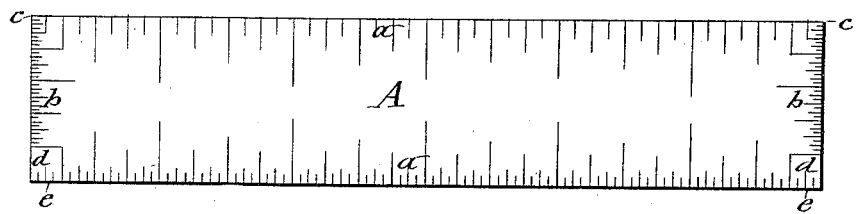
FIG-I-
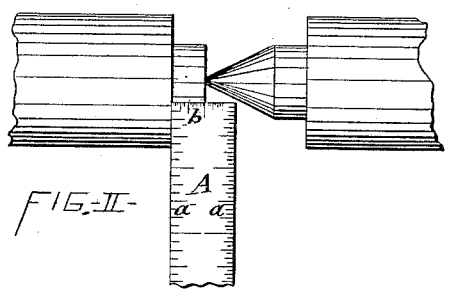
FIG-II-
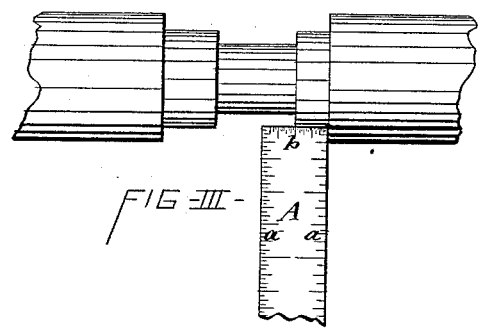
FIG-III-
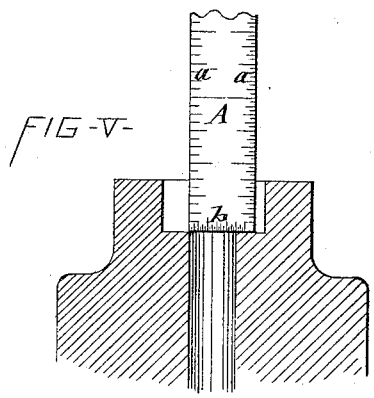
FIG-V-
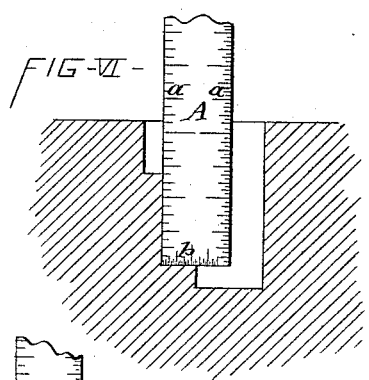
FIG-VI-
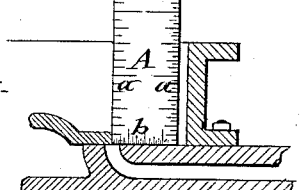
FIG-IV-
WITNESSES
C. Bendixon
E. C. Cannon
INVENTORS:
Herbert J. Leighton
John Coffin

UNITED STATES PATENT OFFICE.

HERBERT J. LEIGHTON, OF SYRACUSE, NEW YORK, AND JOHN COFFIN, OF JOHNSTOWN, PENNSYLVANIA.

GRADUATED SCALE.

SPECIFICATION forming part of Letters Patent No. 325,096, dated August 25, 1885.

Application filed April 13, 1885. (No model.)

*To all whom it may concern:*

Be it known that we, HERBERT J. LEIGHTON, of Syracuse, county of Onondaga, and State of New York, and JOHN COFFIN, of Johnstown, in the county of Cambria, in the State of Pennsylvania, have invented new and useful Improvements in Graduated Scales, of which the following, taken in connection with the accompanying drawings, is a full, clear, and exact description.

The object of this invention is to provide a graduated scale which shall be conveniently introduced into grooves, countersinks, and various recesses, and adapted to measure the depth and width of such recesses, and also for ascertaining the accuracy of right-angled corners of same; and to that end our invention consists of a rectangular plate having straight and parallel longitudinal or side edges, and straight end edges perfectly true and at right angles to the side edges, and graduated for linear measurement on its four longitudinal edges and the entire length thereof, and graduated for linear measurement on two or more of its end edges, and from one corner part way across the end edges, as represented in the annexed drawings.

Figure I is a plan view of our invention; and Figs. II, III, IV, V, and VI illustrate the various uses to which it is applicable.

A represents the aforesaid rectangular plate, which for machinists' use we prefer to form of steel. *a a a a* denote the graduations for linear measurement, extending the whole length of the longitudinal or side edges; and *b b*, the graduations on the end edges, commencing at *c c* with a uniform subdivision of the linear unit, but not extending quite across the ends, leaving spaces *d d* at one corner large enough to be easily distinguished by the eye from the other divisions.

The object in not extending the graduations the entire length of the end edges is to reduce the cost of manufacture, as it does not necessitate making the scale of a standard width, and it is not desirable to cross the finer graduations which we prefer to put on the longitudinal edge marked *e*.

The object of graduating at least two of the end edges is to provide for measuring both ways—that is, from left to right and from right to left.

The annexed illustrations show some of the uses to which our invention may be put. Fig. II shows how a shoulder may be measured on a turned piece of work without taking it out of the lathe. Fig. III shows how in one operation measurements of the depths and widths of rabbets, grooves, or shoulders may be made. Fig. IV shows how the port-opening of a slide-valve may be measured. Fig. V shows a measurement of a counterbored hole, and Fig. VI illustrates the utility of our invention in simultaneously measuring the depth and width of a recess and ascertaining the accuracy of the right-angled corner thereof.

This invention must not be confounded with the well-known scale and protractor consisting of a rectangular plate having various linear measures on the central portion of its surface and lines radiating from a common center on one edge of said plate, and extending to the other three edges designed for angular measurement.

We are aware that prior to our present invention printers' measuring-scales have been made with graduations on the end edges; but such graduations are not intended for linear measurement, neither are they adapted to it. Inasmuch as the graduations do not extend to either corner of the scale, they could only be used for measuring from line to line, and not from a longitudinal edge, as our invention invariably admits of.

It is obvious that printers' measuring-scales of the class aforesaid cannot be used for making the measurements shown in Figs. II, III, IV, and VI of the drawings.

We do not claim, broadly, a scale graduated on its side edges and ends, as scales containing said features to some extent, as hereinbefore stated, have been made for a specific purpose different from ours.

What we claim as our invention, and desire to secure by Letters Patent, is—

The within-described multiple linear measure and square, consisting of a rectangular plate having a straight and parallel longitudinal side edges and straight end edges perfectly true and at right angles to the side edges, and graduated in linear measure on its four longitudinal or side edges and the entire length thereof, and also graduated on two or more of its end edges, the graduations of the latter extending from one corner part way across the end of the scale, substantially in the manner specified and shown, for the purposes set forth.

In testimony whereof we have hereunto signed our names each in the presence of two attesting witnesses.

Signed by HERBERT J. LEIGHTON at Syracuse, New York, April 6, 1885.

HERBERT J. LEIGHTON.

Witnesses for H. J. Leighton:
FREDERICK H. GIBBS,
E. C. CANNON.

Signed by JOHN COFFIN at Johnstown, Pennsylvania, April 8, 1885.

JOHN COFFIN.

Witnesses for John Coffin:
A. MONTGOMERY,
J. FRANK CONDON.